United States Patent
Doteguchi et al.

(10) Patent No.: US 6,346,320 B2
(45) Date of Patent: *Feb. 12, 2002

(54) POLYESTER RESIN COMPOSITE MOLDED ARTICLE

(75) Inventors: Mitsuru Doteguchi; Naonobu Tadokoro, both of Chiba (JP)

(73) Assignee: Teijin Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/214,429

(22) PCT Filed: May 7, 1998

(86) PCT No.: PCT/JP98/02026

§ 371 Date: Jan. 6, 1999

§ 102(e) Date: Jan. 6, 1999

(87) PCT Pub. No.: WO98/51489

PCT Pub. Date: Nov. 19, 1998

(30) Foreign Application Priority Data

May 9, 1997 (JP) ............................................. 9-119252

(51) Int. Cl.$^7$ ........................... B32B 5/00; B32B 15/08; B32B 27/30; B32B 27/36
(52) U.S. Cl. ....................... 428/327; 428/458; 428/461; 428/480; 525/64; 525/176
(58) Field of Search ................................ 428/327, 458, 428/480, 463, 323, 461; 525/64, 165, 176

(56) References Cited

U.S. PATENT DOCUMENTS

| 4,753,980 A | * | 6/1988 | Deyrup ........................ 524/369 |
| 4,759,713 A | * | 7/1988 | Heiss et al. .................. 433/141 |
| 5,277,864 A | * | 1/1994 | Blatz ...................... 264/328.17 |
| 5,300,335 A | * | 4/1994 | Miyazawa et al. ......... 428/35.8 |

FOREIGN PATENT DOCUMENTS

| JP | 56-50058 | 4/1980 |
| JP | 5-25260 B2 | 4/1993 |
| JP | 6 304963 A | 11/1994 |
| JP | 6-304964 A | 11/1994 |
| JP | 8-165409 A | 6/1996 |

* cited by examiner

*Primary Examiner*—Paul Thibodeau
*Assistant Examiner*—Ramsey Zacharia
(74) *Attorney, Agent, or Firm*—Sughrue Mion, PLLC

(57) ABSTRACT

A polyester resin composite molded article composed of a resin composition (A) comprising a polybutylene terephthalate (A1), an inorganic filler (A2) and a modified ethylenic copolymer (A3) produced by the graft-polymerization of an α, β-unsaturated carboxylic acid or its acid derivative and a metal (B) wherein a part or total of the metal (B) is covered with the resin composition (A), the graft copolymer (A3) is present in the form of dispersed particles in the molded part of the resin composition constituting the composite molded article, and the diameters of the dispersed particles are between 1 and 3 μm. The present invention provides a polyester resin composite molded article having excellent thermal shock resistance and exhibiting retention stability in a molding cycle in insert molding, etc.

2 Claims, 1 Drawing Sheet

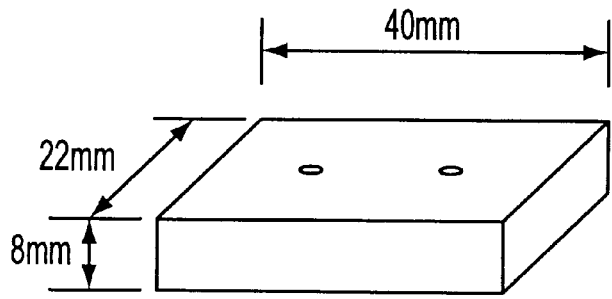
FIG. 1-(1)
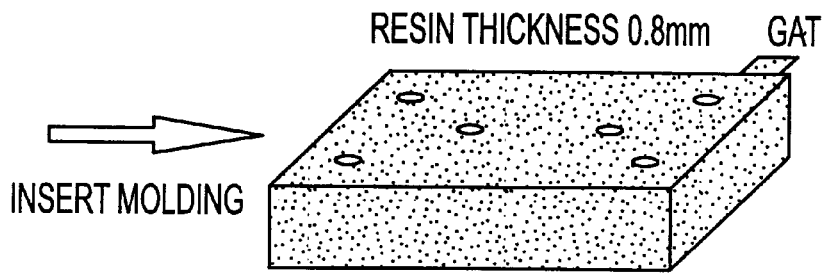
FIG. 1-(2)
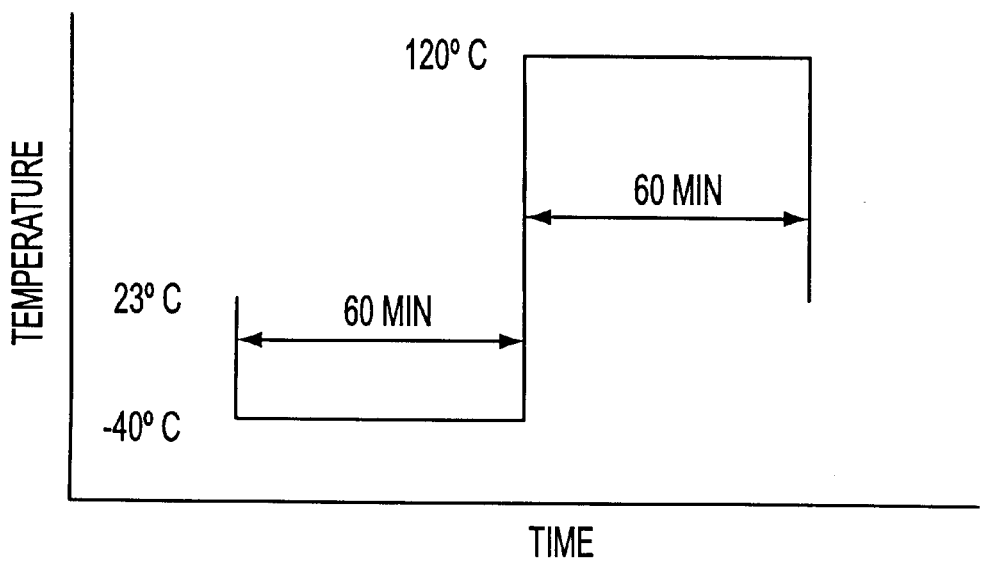
FIG. 2

POLYESTER RESIN COMPOSITE MOLDED ARTICLE

DETAILED DESCRIPTION OF THE INVENTION

1. Technical Field

The present invention relates to a thermoplastic resin composition having excellent durability, especially a polyester resin composite molded article having excellent thermal shock resistance.

2. Background Arts

Polybutylene terephthalate is a thermoplastic material having excellent moldability and exhibiting various excellent characteristics such as solvent resistance, and is used in various fields because a molded article having good physical and mechanical properties can be produced by the melt-molding and injection molding of the polymer.

Examples of representative applications of the resin are electrical and electronic parts, housing of household appliance and automobile. According to the recent tendency to save the energy and cost, an integral molding of a resin material together with a different material such as metal becomes more frequent rather than the use of the resin material as a singly molded part. Thermal stress is generated in the article integrally molded with a metal by the expansion and shrinkage caused by the ambient temperature change because of the non-homogeneous structure of the article.

The durability to thermal stress is called as thermal shock resistance, and a severer thermal shock resistance is required for electrical equipment to be used in an engine room of automobile. The thermal shock resistance of a resin material can be improved by a method to compound a graft polymer composed of an acrylic acid ester and a crosslinkable monomer together with an epoxy compound as disclosed in JP-A 63-3055 (hereunder, JP-A means "Japanese Unexamined Patent Publication) [JP-B 5-25260 (hereunder, JP-B means "Japanese Examined Patent Publication)], a method to compound an olefinic copolymer composed of an α-olefin and an α,β-unsaturated acid glycidyl ester as disclosed in JP-A 6-304963, and a method to compound a graft copolymer of an ethylene-unsaturated carboxylic acid alkyl ester copolymer and a copolymer of a vinyl polymer as disclosed in JP-A 6-304964.

Since a technique to compound a copolymer having epoxy group such as glycidyl group or to compound an epoxy compound is used in these methods, the viscosity increase takes place in a molding method necessitating a long molding cycle such as insert molding to produce a problem of failing in getting an essentially stable molded article.

JP-A 55-50058 (JP-B 57-59261) discloses a technique to improve the impact resistance by mixing a thermoplastic polyester resin under melting with a graft-modified ethylene polymer having a crystallinity of 75% or below and a melt index of 0.01 to 50 and produced by grafting an ethylene polymer or an ethylene-α-olefin copolymer with an α,β-unsaturated carboxylic acid or its acid derivative. Since the technique described in JP-A 55-50058 does not use glass fibers, the obtained composition has low impact resistance and thermal shock resistance insufficient for the use as the composite molded article of the present invention.

JP-A 8-253663 discloses that the thermal-shock resistance of a polyester resin is improved and a light-weight resin composition having excellent impact resistance can be produced by compounding a polyester resin with a graft-modified ethylene-propylene-nonconjugated diene copolymer produced by graft-modifying an ethylene-propylene-nonconjugated diene copolymer with a glycidyl-containing compound and a vinyl monomer.

JP-A 8-283543 discloses that the thermal-shock resistance and weld properties of a polyester resin are improved and a light-weight resin composition having rigidity and impact resistance can be produced by compounding a polyester resin with a polypropylene resin and a graft-modified olefinic elastomer produced by the graft-modification of an olefinic elastomer with a glycidyl-containing compound and a vinyl monomer.

The techniques described in the above JP-A 8-253663 and JP-A 8-283543 use the method to compound a copolymer having epoxy group such as glycidyl group and, accordingly, cause the viscosity increase in a molding method necessitating a long molding cycle such as insert molding to fail in getting an essentially stable molded article.

DISCLOSURE OF THE INVENTION

The object of the present invention is to provide a polyester resin composite molded article having excellent thermal shock resistance and retention stability in the molding cycle of insert molding, etc.

Other objects and advantages of the present invention will be clarified by the following descriptions.

As a result of vigorous investigation to solve the above problems, the inventors of the present invention found that the thermal shock resistance and melt thermal stability were remarkably improved by blending a polybutylene terephthalate with a specific modified polyolefin resin elastomer and adjusting the elastomer particles existing in the composite molded article to have a prescribed particle diameter.

The present invention has the following constitution.

1. A polyester resin composite molded article composed of a resin composition (A) comprising a polybutylene terephthalate (A1), an inorganic filler (A2) and a modified ethylenic copolymer (A3) produced by the graft-polymerization of an α,β-unsaturated carboxylic acid or its acid derivative and a metal (B) wherein a part or total of the metal (B) is covered with the resin composition (A), the graft copolymer (A3) is present in the form of dispersed particles in the molded part of the resin composition constituting the composite molded article, and the diameter of the dispersed particles is between 1 and 3 μm.
2. A polyester resin composite molded article described in the above item 1 wherein the modified ethylenic copolymer (A3) is a modified ethylenic copolymer (A3) graft-polymerized with an acid derivative of an α,β-unsaturated carboxylic acid.
3. A polyester resin composite molded article described in the above item 1 wherein the resin composition (A) is composed of 100 parts by weight of a polybutylene terephthalate (A1), 1 to 125 parts by weight of an inorganic filler (A2) and 5 to 20 parts by weight of a modified ethylenic copolymer (A3) graft-polymerized with an acid derivative of an α, β-unsaturated carboxylic acid.

4. A polyester resin composite molded article described in the above item 1 wherein the polybutylene terephthalate (A1) has an intrinsic viscosity of from 0.5 to 0.9 dl/g.

<<Polybutylene terephthalate>>

The polybutylene terephthalate (A1) to be used in the present invention is a polyester produced by using terephthalic acid as a main acid component and 1,4-butanediol as a main glycol component. The main component means a component accounting for not less than 80 mol %, preferably not less than 90 mol % of the total acid component or total glycol component.

Examples of the copolymerizable acid component are aromatic dicarboxylic acids other than terephthalic acid such as isophthalic acid, naphthalenedicarboxylic acid, diphenyldicarboxylic acid, diphenyl ether dicarboxylic acid, diphenoxyethanedicarboxylic acid and diphenyl ketone dicarboxylic acid; aliphatic dicarboxylic acids such as succinic acid, adipic acid and sebacic acid; alicyclic dicarboxylic acids such as cyclohexanedicarboxylic acid and tetralindicarboxylic acid; etc.

Examples of the copolymerizable glycol component are ethylene glycol, hexamethylene glycol, neopentyl glycol, cyclohexane dimethanol, tricyclodecane dimethylol, xylylene glycol, bisphenol A, bisphenol B and bishydroxyethoxy bisphenol A.

The polyester may be copolymerized with a polyfunctional compound such as glycerol, trimethylolpropane, pentaerythritol, trimellitic acid or pyromellitic acid in an amount not to essentially lose the molding performance of the polyester, for example not more than 3 mol %.

Examples of the other copolymerizable component usable in the production of polybutylene terephthalate are hydroxy acids such as p-hydroxybenzoic acid and p-hydroxyethoxybenzoic acid.

The polybutylene terephthalate used in the present invention has an intrinsic viscosity (35° C., in o-chlorophenol) of preferably 0.3 to 1.2, especially 0.5 to 0.9.

<<Inorganic filler>>

The inorganic filler (A2) to be used in the present invention is, for example, fibrous fillers such as glass fiber, graphite fiber, silica fiber, alumina fiber, boron fiber, feldspar, potassium titanate whisker and potassium borate whisker; flaky fillers such as mica and glass flakes; and powdery or granular fillers such as silica, glass beads, glass balloons, kaolin, wollastonite, calcium silicate and calcium carbonate. These fillers may be used singly or in combination of two or more fillers.

Glass fiber is especially preferable among the above fillers from the viewpoint of mechanical strength, heat-resistance and dimensional stability of the material. The inorganic filler may be a surface-treated one or an untreated one. The compound for the surface-treatment is, for example, a functional compound such as epoxy compound, isocyanate compound, silane compound and titanate compound. These compounds may be applied to the surface of the inorganic filler or added in the preparation of the material.

The compounding amount of the inorganic filler (A2) is preferably 1 to 125 parts by weight based on 100 parts by weight of the polybutylene terephthalate (A1) and preferably 15–45% by weight based on the total resin composition. The resin containing the inorganic fillers in an amount within the above range has high moldability and gives a molded article having excellent mechanical strength.

<<Modified ethylenic copolymer>>

The modified ethylenic copolymer (A3) to be used in the present invention is a modified ethylene polymer produced by the graft-polymerization of an $\alpha$, $\beta$-unsaturated carboxylic acid or its acid derivative to an ethylene polymer or a copolymer of ethylene and an $\alpha$-olefin having a carbon number of 3 or more (hereinafter both polymers are collectively called as unmodified ethylene polymer).

A copolymer-type polymer is preferable as the unmodified ethylene polymer, and the $\alpha$-olefin to be used as a copolymerizing component is propylene, butene-1, hexene-1, decene-1, 4-methylbutene-1. 4-methylpentene-1, etc. Propylene and butene-1 are especially preferable among the above compounds. Examples of the $\alpha$, $\beta$-unsaturated carboxylic acid to be graft-polymerized to the unmodified ethylene polymer are acrylic acid, methacrylic acid, ethacrylic acid, maleic acid and fumaric acid. The acid derivative of the $\alpha$, $\beta$-unsaturated carboxylic acid is ester, acid anhydride, imide, of the above acid.

The modified ethylenic copolymer (A3) is preferably a modified ethylene polymer produced by the graft-polymerization of an acid derivative of an $\alpha$, $\beta$-unsaturated carboxylic acid to an unmodified ethylene polymer to attain higher thermal shock resistance. Maleic anhydride and maleimide are preferable, and maleic anhydride is especially preferable among the acid derivatives of $\alpha$, $\beta$-unsaturated carboxylic acids.

High thermal shock resistance is hardly attainable when the amount of the $\alpha$, $\beta$-unsaturated carboxylic acid graft-polymerized to an unmodified ethylene polymer is too small, and too much grafting of the $\alpha$, $\beta$-unsaturated carboxylic acid causes the problem of the discoloration of the obtained thermoplastic polyester resin composition to yellow or red color to give a molded article having poor appearance. The grafting amount is preferably 0.05 to 3% by weight, more preferably 0.1 to 1% by weight based on 100% by weight of the unmodified ethylene polymer.

The term "graft-polymerization" means that a part or total of the unmodified ethylene polymer is chemically bonded to a monomer or polymer of an $\alpha$, $\beta$-unsaturated carboxylic acid or its acid derivative. Such modified ethylene polymer is easily producible according to conventional method by adding an $\alpha$, $\beta$-unsaturated carboxylihacid or its acid derivative to an unmodified ethylene polymer and melting and kneading the mixture usually at 150 to 300° C.

A screw-type extruder is frequently used for the melting and kneading treatment. Needless to say, an organic peroxide such as $\alpha$, $\alpha'$-bis-t-butylperoxy-p-diisopropylbenzene may be used in an amount of 0.001 to 0.05% by weight based on 100% by weight of the unmodified ethylene polymer to improve the graft-polymerization efficiency.

The unmodifed ethylene polymer to be used as a raw material for the modified ethylene polymer is e.g. a low-density polyethylene or a copolymer produced by the copolymerization of not less than 50 mol %, preferably 80 to 95 mol % of ethylene and not more than 50 mol %, preferably 20 to 5 mol % of an $\alpha$-olefin using a Ziegler-Natta catalyst comprising an organic aluminum compound and a vanadium compound such as vanadium oxytrichloride and vanadium tetrachloride.

Polymers especially preferable as the unmodified ethylene polymer are a series of polymers commercialized by Mitsui Petrochemical Industries, Ltd., in the name of Tafmer®, for example, Tafmer A series (ethylene-butene-1 copolymer) such as Tafmer A-4085, Tafmer A-4090 and Tafmer A-20090 and Tafmer P series (ethylene-propylene copolymer) such as Tafmer P-0180, Tafmer P-0280, Tafmer P-0480 and Tafmer P-0680.

The compounding amount of the modified ethylenic copolymer (A3) is 5 to 20 parts by weight based on 100 parts by weight of the polybutylene terephthalate (A1), preferably 5 to 10% by weight based on 100% by weight of total composition. There is no improvement in thermal shock resistance when the compounding amount of the modified ethylenic copolymer is less than 5 parts by weight, and the lowering of rigidity becomes remarkable when the amount exceeds 20 parts by weight to cause a problem in the use of the resin as an engineering plastic material.

It is necessary in the present invention that the modified ethylenic copolymer (A3) is present in the molded article of the resin composition in the form of dispersed particles having particle diameter of 1 to 3 μm. Sufficient effect on the improvement in the thermal shock resistance cannot be attained when the diameter of the dispersed particle is smaller than 1 μm, and irregularity caused by the particles of the modified ethylenic copolymer is generated on the surface of the molded article when the diameter exceeds 3 μm to produce a problem for practical use.

<<Additives, etc.>>

The thermoplastic resin composition of the present invention may be incorporated with various additives such as flame-retardant, flame-retarding assistant, stabilizer, pigment and mold-releasing agent at arbitrary ratios.

<<Metals>>

The metal (B) to be used in the present invention is a metal composed of a single element such as iron, aluminum, copper, zinc, tin, nickel, titanium, gold, silver, platinum, lead, tungsten, magnesium, vanadium, chromium, manganese and molybdenum or an alloy produced by adding a component such as boron, carbon, nitrogen, silicon, phosphorus and sulfur to a composition composed of the above metals.

<<Production process>>

The composite molded article of the present invention can be produced preferably by the following molding method.

The particle diameter of the dispersed particles in the molded resin article is necessary to be controlled within a specific range in the present invention, and the selection of proper conditions in the extrusion and pelletization step of the composition is necessary for fulfilling the above requirement. Important factors for the control of the dispersed particle diameter are the selection of the type of extruder and screw and the ratio of the extrusion rate Q (kg/h) to the rotational speed of the screw N (r.p.m.) (hereinafter called as Q/N ratio) in the step for the production of the resin composition. The dispersed particle diameter increases with increasing Q/N ratio and decreases with decreasing ratio. The Q/N ratio is preferably 0.3 or more in the mixing of the resin composition to get the composite molded article of the present invention. When the Q/N ratio is smaller than 0.3, the shearing force applied in the melt mixing step increases to decrease the dispersed particle diameter to a level smaller than 1 μm.

The kneading condition of the composition depends upon the extruder to be used in kneading and is preferable to be properly selected so as to adjust the dispersed particle diameter in the molded article to 1 μm or above and 3 μm or below.

The mixing operation can be carried out by a mixer such as tumbler-type blender or a twin-cylinder mixer. An extruder can be used for the melt-mixing and pelletizing processes.

The melting and mixing are preferably carried out under a mixing condition of Q/N≧0.3 in the case of using an extruder having a screw diameter of 44 mm in the melt-kneading process.

The composite molded article can be produced by injection molding, extrusion molding or compression molding.

EXAMPLES

The present invention is described in detail by the following Examples and Comparative Examples. The evaluation methods in the examples are shown below. The unit of the component constituting the composition in the Table 2 and the Table 3 is parts by weight unless otherwise specified.

Production of Impact Modifier A

A modified ethylene polymer (impact modifier A) was produced by blending 100 parts by weight of unmodified ethylene-propylene copolymer (Tafmer P0680: product of Mitsui Petrochemical Industries, Ltd.), 0.025 part by weight of α, α'-bis-t-butylperoxy-p-diusopropylbenzene dissolved in a small amount of acetone and 0.5 part by weight of maleic anhydride in a Henschel mixer and extruding and pelletizing the blended mixture with a twin-screw extruder having a screw diameter of 44 mm at a cylinder temperature of 230° C.

Evaluation Methods

[Fluidity and Retention Stability]

MFR was measured by a semi-automatic melt-indexer (product of Toyo Seiki Seishaku-sho, Ltd.) at a test temperature of 250° C. and a load of 2.16 kgf in conformity to JIS K7210A except for the selection of the preheating time of 6 min and 20 min, and the retention stability was evaluated by the ratio of the MFR values of 20 min/6 min.

[Test Pieces for Thermal Shock Resistance]

A molded article covering a metal (SKD-11, JIS G4404) shown by the FIG. 1 was molded by insert-molding using an injection molding machine having a clamping pressure of 15 tons and a shot capacity of 18 cm³ at a cylinder temperature of 260° C., a mold temperature of 80° C. and a total cycle time of 45 sec.

[Thermal Shock Resistance]

The test to apply a thermal shock was repeated until a crack was generated in the above test piece using the test cycle shown by the FIG. 2 as one cycle. The thermal shock resistance was evaluated by the number of cycles to generate a crack.

[Determination of Dispersed Particle Diameter]

The molded resin part constituting the test piece used in the thermal shock resistance test was peeled, the olefin component was dissolved in hot xylene at 140° C. for 3 hr and the ruptured face was photographed with an electron microscope to determine the particle diameter.

The electron microscope used in the test was Type JSM-6100 (manufactured by JEOL, Ltd.) and the magnification of photograph was 2,000. Diameters of 50 dispersed particles were measured with a scale and the average was used as the dispersed particle diameter.

EXAMPLES 1 to 3 and COMPARATIVE EXAMPLES 1 to 4

A polybutylene terephthalate having an intrinsic viscosity (in o-chlorophenol, 35° C.) of 0.71 dl/g (hereinafter described as PBT-A) was preliminarily mixed homogeneously with an impact modifier shown in the Table 1 at a ratio shown in the Table 2, and the mixture was melted, kneaded and pelletized with a twin screw extruder (shown as EXT-A in the table) having a screw diameter of 44 mm at a barrel temperature of 250t, an extrusion rate of 50 kg/h and a screw rotational speed of 120 r.p.m. The Q/N value was 0.42. Physical properties were evaluated according to the aforementioned methods and the results are shown in the Table 2.

TABLE 1

| Substance | | Details |
|---|---|---|
| Impact Modifier A | Ethylene-propylene copolymer modified with maleic anhydride | |
| Impact Modifier B | Unmodified ethylene-propylene copolymer | Trade name: Tafmer P0680 Mitsui Petrochem. Ind. |
| Impact Modifier C | Glycidyl methacrylate-butyl acrylate graft polymer | Trade name: EXL2314 Kureha Chemical Industry |
| Impact Modifier E | Ethylene-glycidyl methacrylate-methyl acrylate copolymer | Copolymerized with 6 wt. % Glycidyl methacrylate and 30 wt. % methyl acrylate |
| Impact Modifier F | Ethylene-ethyl acrylate copolymer | Copolymerized with 35 wt. % ethyl acrylate |
| Epoxy compound | Bisphenol A epoxy compound | Trade name: EP828 Yuka Shell Epoxy Corp. |

EXAMPLES 4 and 5 and COMPARATIVE EXAMPLES 5 to 7

A polybutylene terephthalate having an intrinsic viscosity (in o-chlorophenol, 35° C.) of 0.71 dl/g (hereinafter described as PBT-A) and a polybutylene terephthalate having an intrinsic viscosity (in o-chlorophenol, 35° C.) of 0.87 dl/g (hereinafter described as PBT-B) were preliminarily mixed homogeneously with an impact modifier A shown in the Table 1 at a ratio shown in the Table 3 (in terms of parts by weight), and the mixture was melted, kneaded and pelletized with an extruder shown in the Table 4 at a barrel temperature of 250° C. under a condition shown in the Table 3. Physical properties were evaluated by using the produced pellets and the results are shown in the Table 3.

TABLE 2

| | Unit | Ex. 1 | Ex. 2 | Ex. 3 | Comp Ex. 1 | Comp Ex. 2 | Comp Ex. 3 | Comp Ex. 4 |
|---|---|---|---|---|---|---|---|---|
| PBT-A | pt. wt. | 100 | 100 | 100 | 100 | 100 | 100 | 100 |
| Impact Mod. A | pt. wt. | 15 | 10 | 13 | | | | |
| Impact Mod. B | pt. wt. | | | | | 15 | | |
| Impact Mod. C | pt. wt. | | | | | | 11.25 | |
| Impact Mod. E | pt. wt. | | | | | | 3.75 | 3.75 |
| Impact Mod. F | pt. wt. | | | | | | | 11.25 |
| Epoxy compound | pt. wt. | | | | | | 2 | 2 |
| Glass fiber | pt. wt. | 50 | 90 | 20 | 43 | 50 | 50 | 50 |
| Thermal Shock Resistance. | Cycle | 150 | 130 | 200 | 10 | 30 | 130 | 130 |
| MFR (6 min) | g/10 m | 14.1 | 8.5 | 24.1 | 21.0 | 18.8 | 6.6 | 12.3 |
| MFR (20 min) | g/10 m | 15.0 | 9.2 | Z6.0 | 22.0 | 19.5 | 2.5 | 3.0 |
| Retentn. Stability | — | 1.06 | 1.08 | 1L08 | 1.05 | 1.03 | 0.37 | 0.24 |

TABLE 3

| | Unit | Ex. 1 | Ex. 4 | Ex. 5 | Comp. Ex. 5 | Comp. Ex. 6 | Comp. Ex. 7 |
|---|---|---|---|---|---|---|---|
| PBT-A | pt. wt. | 100 | | 100 | 100 | 100 | 100 |
| PBT-B | pt. wt. | | 100 | | | | |
| Impact Modifier A | pt. wt. | 15 | 15 | 15 | 15 | 15 | 15 |
| Glass fiber | pt. wt. | 50 | 50 | 50 | 50 | 50 | 50 |
| Extruder | | EXT-A | EXT-A | EXT-B | EXT-A | EXT-B | EXT-C |
| Extrusion rate | kg/hr | 50 | 50 | 100 | 50 | 260 | 55 |
| Screw rev. speed | r.p.m. | 120 | 120 | 220 | 275 | 220 | 70 |
| Q/N | — | 0.42 | 0.42 | 0.45 | 0.18 | 1.18 | 0.79 |
| Dispersed particle diameter | μm | 1.8 | 1.2 | 2.4 | 0.8 | 3.2 | 3.5 |
| Standard deviation | μm | 0.7 | 0.4 | 0.9 | 0.3 | 1.0 | 1.2 |
| Thermal shock resistance | cycle | 150 | 180 | 130 | 80 | 100 | 100 |
| MFR (6 min) | g/10 m | 14.1 | 8.5 | 12.7 | 15.5 | 11.4 | 9.9 |

TABLE 4

| Extruder | No. of screws | Rotational direction | Screw diameter |
|---|---|---|---|
| EXT-A | Twin screw | Same direction | 44 Ø |
| EXT-B | Twin screw | Same direction | 65 Ø |
| EXT-C | Single screw | — | 65 Ø |

EFFECT OF THE INVENTION

The polyester composite molded article produced by the present invention has excellent thermal shock resistance and is usable especially suitably as automobile parts in a form integrally molded with a metallic part.

BRIEF EXPLANATIONS OF THE DRAWINGS

FIG. 1 is a test piece used in the evaluation of thermal shock resistance. FIG. 1-(1) is the shape of the metal (material: SKD-11) of the core part. FIG. 1-(2) is a test piece composed of a metal (material: SKD-11) and a resin coating having the thickness of 0.8 mm and produced by the insert molding of the metal.

FIG. 2 is the test cycle in the evaluation of thermal shock resistance.

INDUSTRIAL UTILIZATION

The polyester composite molded article obtained by the present invention has excellent thermal shock resistance and is usable especially preferably as automobile parts in a form integrally molded with a metallic part.

What is claimed is:

1. A composite article molded by insert-molding comprising a resin composition (A) comprising 100 parts by weight of a polybutylene terephthalate (A1), 1 to 125 parts by weight of an inorganic filler (A2) and 5 to 20 parts by weight of a modified ethylenic copolymer (A3) produced by the graft-pyolgmerization of an α, β-unsaturated carboxylic acid anhydride and a molded article of metal (B)

wherein a part or all of the molded article metal (B) is covered with the molded article of resin composition (A), the modified etheylenic copolymer of the component (A3) is present in the form of dispersed particles in the molded article of the resin composition (A) constituting the composite molded article, and the diameters of the dispersed particles are between 1 and 3 μm.

2. A composite molded article described in claim 1 wherein the polybutylene terephthalate (A1) has an intrinsic viscosity of from 0.5 to 0.9 dl/g in o-chlorophenol at 35° C.

* * * * *